Sept. 19, 1950  J. MERCIER  2,523,135
COUPLING
Filed March 7, 1946  3 Sheets-Sheet 1
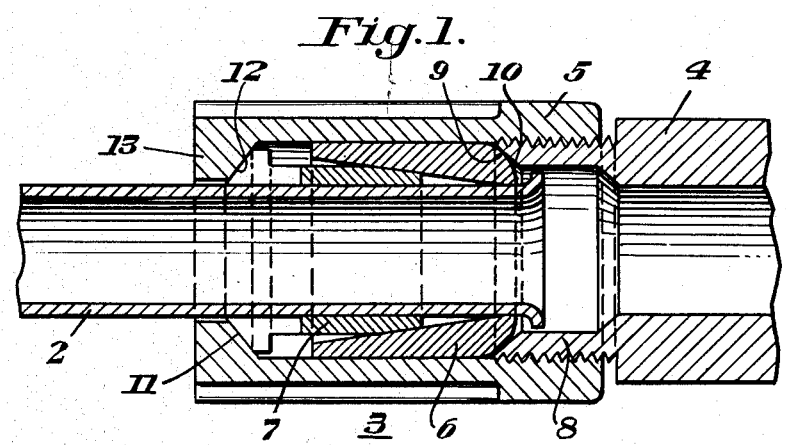
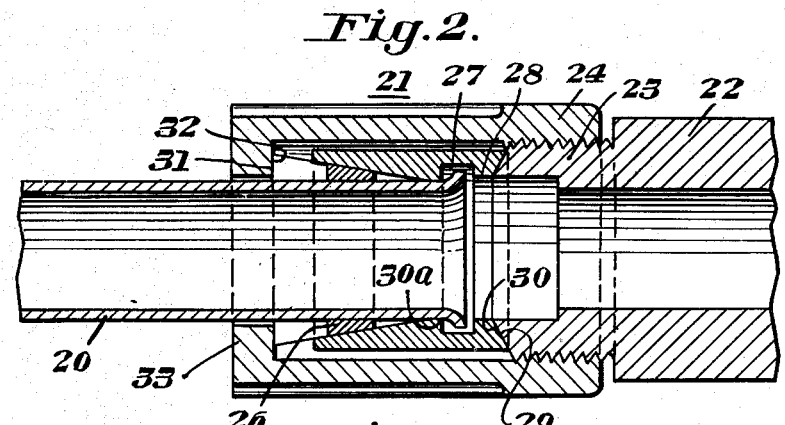
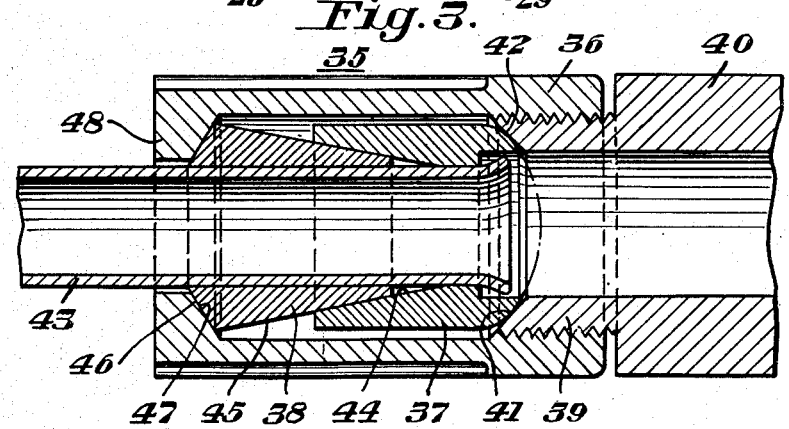
INVENTOR
Jean Mercier Sept. 19, 1950 J. MERCIER 2,523,135
COUPLING
Filed March 7, 1946 3 Sheets-Sheet 2
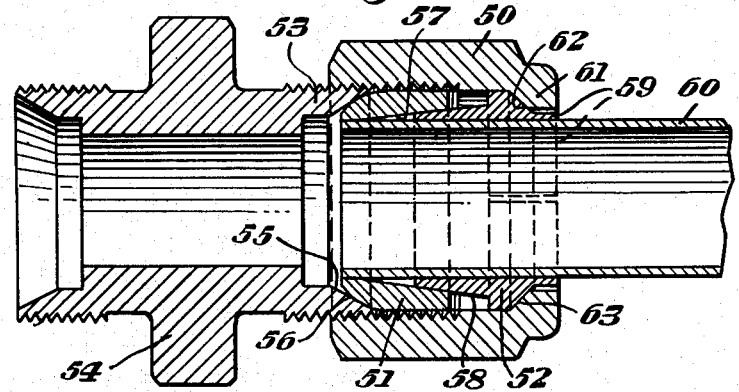
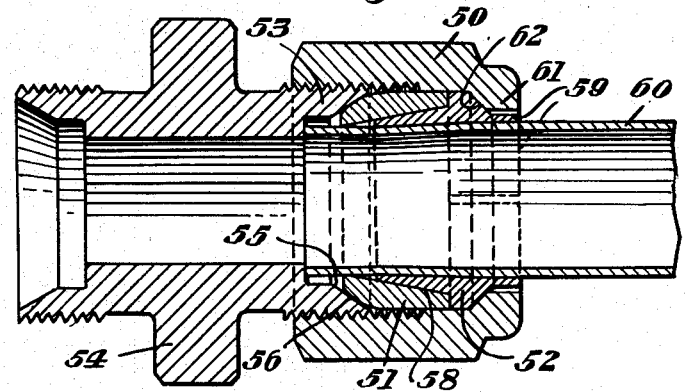
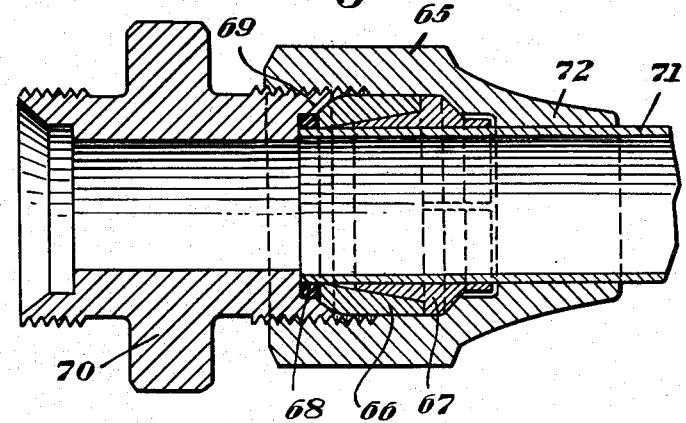
INVENTOR
Jean Mercier Sept. 19, 1950  J. MERCIER  2,523,135
COUPLING
Filed March 7, 1946  3 Sheets-Sheet 3

INVENTOR
Jean Mercier

Patented Sept. 19, 1950

2,523,135

UNITED STATES PATENT OFFICE 2,523,135

COUPLING

Jean Mercier, New York, N. Y.

Application March 7, 1946, Serial No. 652,684

5 Claims. (Cl. 285—122)

The present invention relates to couplings, and more particularly to couplings for joining thin-walled tubing to a fitting or union without the necessity of threading the tube, which, in the case of thin-walled tubing, is impractical.

Considerable difficulty has been experienced heretofore in effecting a satisfactory connection between thin-walled tubing and fittings, in view of the fact that it is impractical to thread such tubing and in view of the fact that excessive radial pressures must be avoided, although sufficient radial pressure must be exerted to prevent axial displacement of the tube relative to the fitting. Moreover, such radial pressures must be exerted in such a way that they will not be relieved by vibrations to which the joint may be subjected. This difficulty has been particularly marked in the use of thin-walled tubing in pressure lines, because of the fact that the pressures employed tend to force the tubing axially from the coupling member. Deformation of the tube itself has been resorted to in many instances, but this, at times, requires an additional operation in the formation of the joint, and hence increases the cost of installation. Also, unless the deformation is uniform throughout the circumference of the tube a leaky joint may result. Moreover, any appreciable deformation of the tubing provides a restricted portion which causes the pressure in the line, and hence the tendency toward displacement, to be increased.

Various types of couplings have been used heretofore for joining thin-walled tubing together and for joining thin-walled tubing to fittings, but all such couplings have possessed one or more of the objectionable features mentioned above, or have been extremely expensive from the manufacturing and installation standpoints.

The coupling which I provide by the present invention is free of the objectionable features mentioned above, and has only a few parts, all of which lend themselves to high speed manufacturing operations and, as a consequence, the coupling which I provide is easy and cheap to manufacture. It is also of such character that it can be readily installed in the field by unskilled workmen. Furthermore, it is of such character that the tube will be tightly gripped over a substantial area by one of the parts of the coupling, and also at a point spaced therefrom and, as a consequence, the tube will be maintained in position against substantial forces tending to displace it from the coupling and will not be objectionably deformed in the formation of the joint.

In the accompanying drawings, I have shown for purposes of illustration only, several embodiments of my invention. In the drawings:

Figure 1 is a longitudinal section through a joint embodying a coupling provided by my invention;

Figure 2 is a longitudinal section through a joint embodying a modified form of my coupling;

Figure 3 is a longitudinal section through a joint formed by a still further embodiment of my invention;

Figure 4 is a longitudinal section through another embodiment of my invention, the parts being shown in the position they would normally occupy prior to the tightening of them to form the joint;

Figure 5 is a longitudinal section through the coupling illustrated in Figure 4, showing the apparatus in the positions occupied by them after the nut has been tightened and the parts forced into tube gripping position;

Figure 6 is a longitudinal section through a joint embodying a further modified form of my invention;

Figure 7:
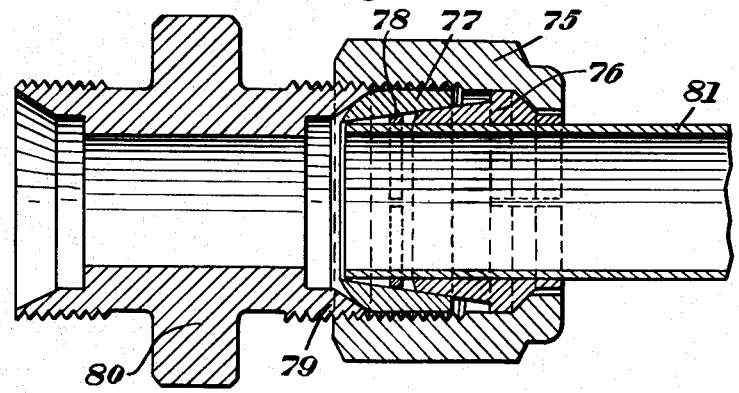
Figure 7 is a longitudinal section, showing a coupling similar to the coupling of Figure 4, except that a split ring has been added thereto for the purpose of holding the parts in pre-assembled position.

The joint illustrated in Figure 1 comprises a tube 2, a coupling indicated generally by the reference character 3, and a fitting or union 4. The coupling comprises a nut 5, a ring 6 positioned in the nut, and a sleeve 7 likewise positioned in the nut. The fitting 4 is provided with a threaded extension 8 on which the nut 5 is threaded.

The ring 6 has an outer diameter which is substantially the same as the inner diameter of the nut 5, so that it will fit snugly in the nut. The forward end of the ring is curved radially inwardly so as to provide a bearing surface 9 extending angularly with respect to the normal to the axis thereof for abutting the flared forward end 10 of the fitting extension. The inner diameter of the ring at the forward end is approximately the same as the outer diameter of the tube. The forward end of the ring has a relatively sharp edge so that when the joint is formed, it will grip the tube tightly and, to some extent, bite into the tube. The forward end of the ring is preferably hardened, although in most instances it is only necessary that the ring be made of a harder metal than the tube itself. The inner diameter of the ring, at the end opposite the forward end, is preferably larger than the diameter at the forward end, and the inner face of the ring slopes gradually from one end of the ring to the other, so as to provide a tapered surface for cooperation with the sleeve 7.

The sleeve 7 has an inner diameter substantially the same as the outer diameter of the tube, and it is of sufficient thinness at the forward end to permit the end portion to extend into the space provided between the tapered inner face of the ring 6 and the tube. The outer face of the sleeve adjacent the forward end is tapered to cooperate with the tapered inner face of the ring 6. The other end of the sleeve 7 is provided with a transverse face 11, adapted to cooperate with the sloping surface 12 on the radially extending flange 13 of the nut. This end of the sleeve is slotted longitudinally for reasons which will be apparent from what is stated hereinafter.

The nut 5 is internally threaded at its forward end for cooperation with the threaded extension of the fitting. Intermediate the ends of the nut the inner diameter is appreciably larger than the outer diameter of the tube so as to form a chamber between the tube and the nut in which the sleeve and ring may be positioned in the manner illustrated. The end of the nut opposite the threaded end has a radially extending flanged portion which, as stated above, is arranged to bear against the one end of the sleeve.

The tube 2 illustrated in Figure 1 has a flared end. However, the flaring of the end is not necessary for certain sizes of tubing, and particularly where the tubing is made of a soft metal. However, where the tube is of stainless steel, I have found it preferable to flare the end of the tube, so that if substantial longitudinal forces are exerted on it, it will not be pulled from the coupling. The opening in the threaded extension of the union is of sufficient size to permit the flaring of the tube, this opening being preferably somewhat larger than the internal diameter of the tube and the internal diameter of the fitting.

In the forming of a joint such as that shown in Figure 1, the sleeve and the ring are first placed in the nut. The nut is then placed over the end of the tube, and, if desired, the tube end is flared. The tube end and the nut are then brought into position adjacent the threaded extension of the fitting and the nut is threaded on the fitting. As the nut is threaded on the fitting, the forward end of the ring moves into engagement with the frusto-conical face 10 of the fitting. The forward end of the sleeve is moved forwardly between the ring and the tube, and the tube is gripped tightly by the sleeve and the ring. The forward end of the ring bites into the outer wall of the tube to some extent. Also, the sleeve, due to the fact that it is slotted, grips the tube tightly over a substantial area. As the nut is threaded into its most forward position, the tapered surface 12 forces the slotted end of the sleeve into the tight engagement with the tube.

The joint illustrated in Figure 2 comprises a tube 20, a coupling indicated generally by the reference character 21, and a fitting 22 having a threaded extension 23 thereon. The coupling comprises a nut 24, a ring 25 and a sleeve 26. The ring 25 is similar to the ring 6 of the joint shown in Figure 1. However, in this embodiment the ring extends forwardly beyond the flared end of the tube and is provided with a recess 27 adapted to receive the flared end of the tube. The forward end 28 of the ring has a tapered face 29 which bears against the tapered face 30 of the fitting extension. In the embodiment shown in Figure 1 the inner surface of the end of the extension is flared, but in the embodiment shown in Figure 2 the outer surface of the end of the extension is beveled to provide the bearing surface 30, against which the forward end of the ring bears. Intermediate its ends the ring 25 is provided with a relatively short section having an internal diameter substantially the same as that of the tube. The sharp edge 30a at the junction between the constricted portion and the recess 27 is adapted to bite into the tube, to some extent, as the joint is formed. Beyond the constricted section, the inner surface of the ring 25 tapers outwardly so as to provide space between the inner face thereof and the tube for the forward end of the sleeve 26. The rear end of the sleeve 26 is slotted and has a transverse face 31, adapted to bear against the inner face 32 of the radially extending flange 33 of the nut 24.

Where the coupling illustrated in Figure 2 is used, the joint is formed in the same way as that described above. As in the case of the coupling shown in Figure 1, the ring bites into the tube adjacent the tube end and the sleeve 26 grips the tube tightly over a substantial area, and without excessive deformation of the tube.

In the embodiment shown in Figure 3, the coupling 35 comprises a nut 36, a ring 37 and a sleeve 38. One end of the nut is internally threaded for cooperation with the threaded extension 39 on the fitting 40. The end of the extension 39 is flared to provide a bearing surface 41 for cooperation with the rounded end 42 of the ring 37.

The forward end of the ring 37 has a diameter substantially greater than the outer diameter of the tube 43 so as to receive the flared end of the tube. The ring is provided with a portion adjacent the forward end having a diameter substantially the same as the diameter of the tube, and where this section of the ring joins the recessed portion a hard, relatively sharp edge is provided which bites into the tube when the parts are brought into position. Between this section and the rear end of the ring, the inner diameter progressively increases to provide a tapered inner surface 44, which cooperates with the tapered outer surface 45 of the sleeve 38. The inner diameter of the sleeve 38 is substantially the same as the outer diameter of the tube. The rear end of the sleeve is bevelled to provide a face 46 cooperating with the tapered inner face 47 of the flanged end portion 48 of the nut.

The joint illustrated in Figure 3 is formed in substantially the same way as the joint described above in reference to Figure 1. The ring is forced against the end of the fitting and grips the tube. The sleeve, which may or may not be slotted, also grips the tube. The sleeve grips the tube over a relatively long area of contact, whereas the ring grips the tube over a very short contact area.

The coupling illustrated in Figures 4 and 5 comprises a nut 50, a ring 51, and a sleeve 52. The nut is internally threaded for cooperation with the threaded end 53 of the fitting 54. The inner face of the extension 53 is flared outwardly at the end to provide a bearing surface 55 against which the bearing surface 56 of the ring abuts. The inner diameter of the ring progressively increases from the forward end toward the rear end so as to provide a tapered inner surface 57 for cooperation with the tapered outer surface 58 of the sleeve.

The sleeve 52 of this embodiment is somewhat similar to the sleeve shown in Figure 1 except that it is provided with a slotted tail-like extension 59 which extends rearwardly along the tube 60 and between it and the flange of the nut 50. The flange 61 on the nut has an inner tapered face 62 which abuts a tapered face 63 on the sleeve itermediate the ends thereof.

As illustrated in Figure 4, the parts have not been forced into the positions they occupy after the joint has been formed. They are illustrated in the position they normally occupy as the nut is started on the threads on the fitting. However, in Figure 5, the parts are illustrated in the form they assume upon the threading of the nut 50 into position where it has forced the sleeve and the collar into tight engagement with the tube.

In the embodiment shown in Figure 6, the coupling comprises a nut 65, a ring 66, a sleeve 67, and a sealing ring 68. The forward end of the nut 65 is threaded for cooperation with the threads carried by the extension 69 on the fitting 70. The inner face of the forward end of the extension is bevelled for cooperation with the sealing ring 68. This sealing ring is preferably made of rubber or some synthetic elastomer. This sealing ring is positioned between the bevelled face of the extension, the tube 71 and the ring 66. The ring 66 and the sleeve 67 are substantially the same as the corresponding parts of the embodiment shown in Figures 4 and 5. The sleeve 67, like the sleeve 52, has a tail-like extension, and the end of the sleeve is slotted so as to tightly grip the tube and eliminate the effects of vibrations to which the tube may be subjected.

The nut 65, in this embodiment, has an extension 72 thereon, which extends along the tube beyond the sleeve 67, the inner diameter of the extension beyond the sleeve 67 being substantially the same as the outer diameter of the tube. The extension of the nut, of course, is not slotted, but the extension does assist in relieving the coupling of the adverse effects of the vibrational forces to which it may be subjected.

In this embodiment, as well as in those just described, the principal gripping force is exerted on the tube by the ring 66 and the sleeve 67. The sealing ring 68 is distorted when the parts are in operative position. It grips the tube and, at the same time, seals the joint against egress of fluids from the tube and the fitting to which it is joined.

The coupling illustrated in Figure 7 comprises a nut 75, a sleeve 76, a ring 77 and a split ring 78. The nut 75 is internally threaded for cooperation with the threaded extension 79 on the fitting 80. The ring 77, the sleeve 76 and the nut 75 are the same as the corresponding parts of the embodiment illustrated in Figures 4 and 5.

The split ring 78 has a normal internal diameter substantially the same as the tube 81 around which it extends. It it relatively thin, but is sufficiently thick to extend between the tube and the tapered inner face of the ring 77. The split ring 78 provides a further gripping force on the tube as the parts are moved into operative position, and, in addition, it serves to permit preassembly of the ring and sleeve in the nut, so that there cannot be any mistake in assembling the parts in the field.

Figure 8:
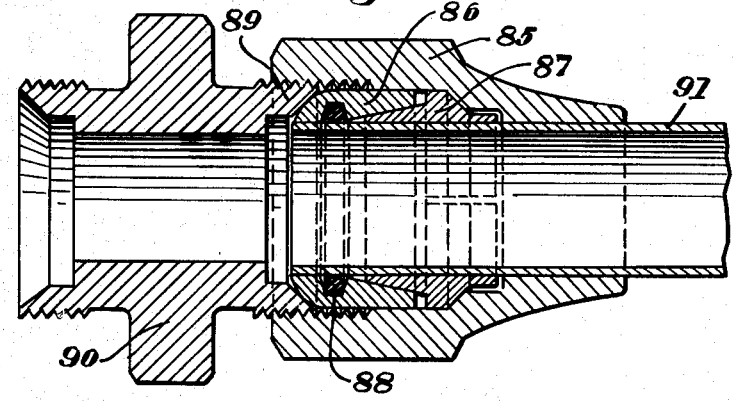
Figure 8 is a longitudinal section through another embodiment of my invention, the parts being shown in partly assembled position.

In the embodiment shown in Figure 8, the coupling comprises a nut 85, a ring 86, a sleeve 87 and a sealing ring 88 carried by the ring 86. As in the other embodiments described above, the nut 85 is internally threaded for cooperation with the threaded extension 89 of the fitting 90, and the forward end of the extension is bevelled for cooperation with the rounded forward end of the ring 86. The nut 85 is similar to the nut 65 of the embodiment shown in Figure 6, in that it is provided with an extension surrounding the tube 91.

In this embodiment, the ring 86 is recessed to receive the sealing ring 88. This ring, which is made of rubber or some synthetic elastomer, surrounds the tube 91 and seals the joint against egress of gases or other fluids which may be carried in the line.

Figure 9:
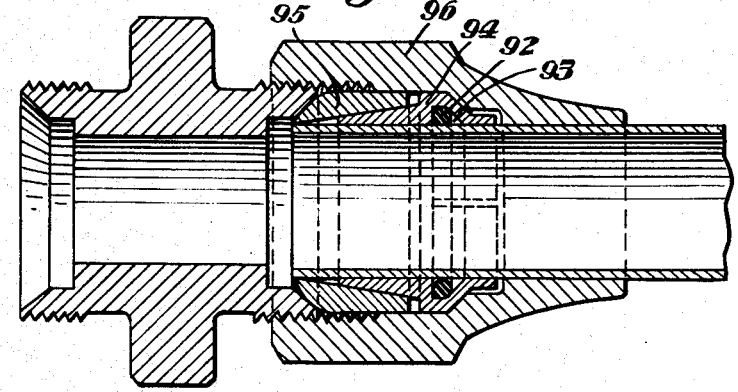
Figure 9 is a longitudinal section through a further embodiment of my invention in which the parts are shown in partly assembled position.

The embodiment shown in Figure 9 is substantially the same as that shown in Figure 8, except that in this embodiment no sealing ring is mounted in the main ring, but a sealing ring 92 is mounted in a recess 93 in the sleeve 94. The ring 95 annd the nut 96 are like the corresponding parts in Figure 8, except in the respect just noted. The sealing ring 92 performs the same function in this embodiment as in the embodiment shown in Figure 8, namely, the sealing of the joint against egress of gases and the like.

It will be apparent to those skilled in the art that all of the embodiments of my invention described above possess advantages over couplings utilized heretofore for thin-walled tubing. It will be apparent that a tight grip on the tube is effected over a substantial area by the sleeve, and that the ring also tightly grips the tube, but over a restricted area. Due to the gripping of the tube over a substantial area the effects of vibrational forces are greatly minimized.

The parts of the coupling may be formed of any suitable metal, so long as the choice of metals is such that no electrolytic action will take place where unlike metals are contacted with each other. The ring is preferably of cadmium plated steel or stainless steel. The sleeve is also preferably of cadmium plated steel or stainless steel. The nut and the fitting may be of stainless steel or bronze, or an aluminum alloy, or some other suitable metal.

This application is a continuation-in-part of my application Serial No. 537,029, filed May 24, 1944, now Patent No. 2,413,840.

While I have shown and described several embodiments of my invention, it will be understood that it is not limited thereto, but may be otherwise embodied within the scope of the appended claims.

I claim:

1. A coupling for joining together a tube having a flared end and a fitting having an extension which is externally threaded and which has a frusto-conical end face, comprising (1) a nut, said nut having an inner diameter appreciably greater than the outer diameter of the tube so as to form a chamber between the tube and the nut, an internally threaded end portion for cooperation with the externally threaded extension of the fitting, and a radially inwardly extending flange at the end opposite the threaded end for forming an end wall for the chamber, (2) a sleeve positioned in the chamber and extending around the tube, said sleeve having an inner diameter substantially the same as the outer diameter of the tube, and a tapered outer face, the taper extending toward the end of the tube when in position in the nut, and (3) a ring in the chamber arranged to overlie a portion of said sleeve and extending forwardly toward the fitting to a point beyond the sleeve, said ring having a tapered inner face arranged to engage and slide along the tapered outer face of the sleeve, the internal diameter of a portion of the ring between the sleeve and the fitting extension being less than the outer diameter of the sleeve and being approximately the same diameter as the outer diameter of the tube, said ring having a bearing surface at one end thereof extending angularly with respect to the axis thereof for abutting the frusto-conical end face of the fitting extension, said ring also being recessed between the forward end abutting the end face of the fitting and the tapered surface overlying the sleeve so that said recess may receive the flared end of the tube, the combined length of the ring and the sleeve being greater than the distance between the flanged end portion of the nut and the end face of the fitting extension when the nut is threaded into operative position on the fitting.

2. A coupling for joining together a tube and a fitting having an extension which is externally threaded and which has a frusto-conical end face, comprising a nut, said nut having a threaded forward end portion, an internal diameter appreciably greater than the outer diameter of the tube so as to form a chamber between the tube and the nut, and a radially inwardly flanged end portion forming an end wall for the chamber, a sleeve in the chamber extending peripherally around the tube, the inner diameter of the sleeve being substantially the same as the outer diameter of the tube, said sleeve having a tapered outer surface tapering forwardly toward the fitting, a ring in the chamber arranged to overlie a portion of the sleeve, said ring having an internal diameter increasing from the forward end toward the other end, the diameter of the forward end being substantially the same as that of the tube, and a sealing ring positioned in said chamber and extending around the tube for sealing the coupling against egress of gases.

3. A coupling as defined in claim 2, characterized by the sealing ring being positioned between the forward end of the ring and the end face of the fitting.

4. A coupling as defined in claim 2, characterized by the ring having an angularly extending bearing surface at the forward end thereof for abutting the end face of the fitting extension, and a recess intermediate its ends for receiving the sealing ring.

5. A coupling as defined in claim 2, characterized by the ring having a bearing surface extending at an angle to the normal to the axis of the extension for abutting the end face of the extension and the sleeve having a groove therein intermediate its ends for receiving a sealing ring.

JEAN MERCIER.

REFERENCES CITED

The following references are of record in the file of this patent:

UNITED STATES PATENTS

| Number | Name | Date |
|---|---|---|
| 762,545 | Merriam | June 14, 1904 |
| 2,211,856 | Kreidel | Aug. 20, 1940 |
| 2,320,812 | Cowles | June 1, 1943 |